United States Patent [19]

Matsuda

[11] Patent Number: 4,989,967
[45] Date of Patent: Feb. 5, 1991

[54] LENS FOR SPECTACLES

[76] Inventor: Ryoji Matsuda, 1-15, Konyamachi, Kokurakita-ku, Kitakyushu-shi, Fukuoka, Japan

[21] Appl. No.: 334,852

[22] Filed: Apr. 6, 1989

[30] Foreign Application Priority Data

Apr. 8, 1988 [JP] Japan ................................. 63-47852
Jun. 13, 1988 [JP] Japan ................................. 63-78190

[51] Int. Cl.$^5$ ............................................. G02C 7/10
[52] U.S. Cl. ..................................... 351/165; 351/166
[58] Field of Search ............... 351/165, 159, 166, 163, 351/164

[56] References Cited

U.S. PATENT DOCUMENTS 3,731,993 5/1973 Piringer ................................ 351/165
4,257,692 3/1981 Le Naour-Sene .................. 351/159

Primary Examiner—Scott J. Sugarman
Attorney, Agent, or Firm—Wenderoth, Lind & Ponack

[57] ABSTRACT

A lens for spectacles having at least one side thereof coated with a surface layer in a predetermined pattern so that transparent portions will be left on the lens. The transparent portions should have such an area that the light transmission rate will be larger than a predetermined value. The surface layer may be made of a fluorescent material, a light absorbing material or a light reflecting material. An interface layer such as a light absorbing layer may be interposed between the lens body and the surface layer. A protective layer may be provided on the surface layer. The lens may be made by bonding two half lenses with surface layers sandwiched therebetween.

5 Claims, 2 Drawing Sheets

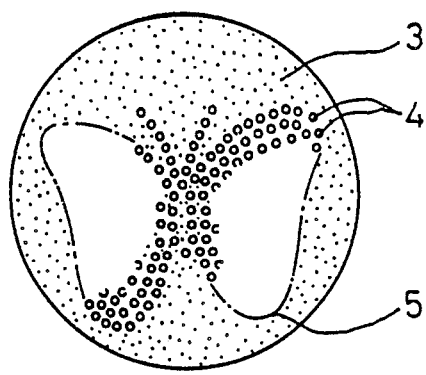
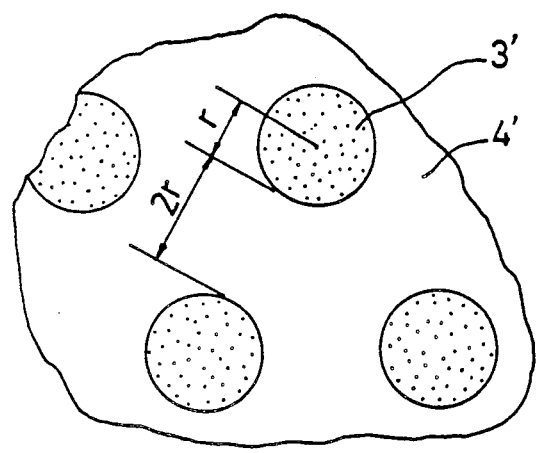
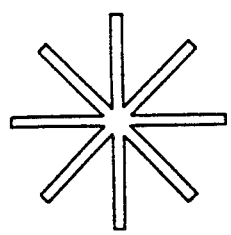
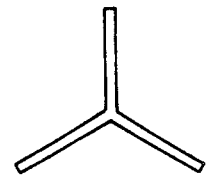
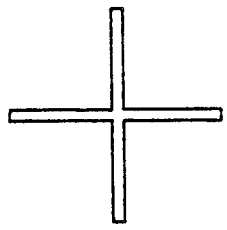
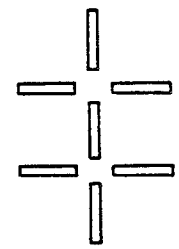
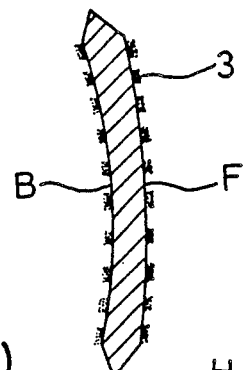
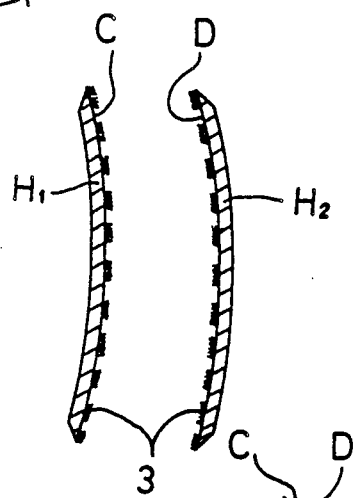
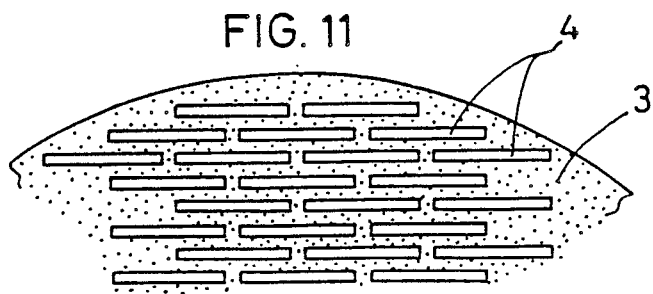
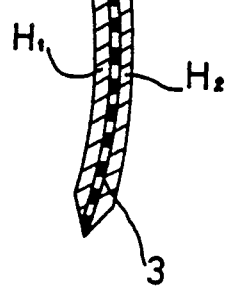

4,989,967

LENS FOR SPECTACLES

BACKGROUND OF THE INVENTION

The present invention relates to a lens for spectacles, and specifically a lens which has a fashionable appearance and has excellent anti-glare properties.

It is a common practice to mix an ultrared or ultraviolet absorbing material in lenses for glasses, particularly for lenses for sunglasses, or to merely color them. Such lenses serve to protect the wearer's eyes and keep him from being dazzled. Another aspect of such lenses is their fashionableness.

One problem with such prior art lenses is that they merely serve to absorb or reflect light. If the absorption or reflectance of light is increased to improve the anti-glare properties and thus to protect the wearer's eyes, the light transmission rate will drop considerably. Further, in an environment where no or little light exists such as in the nighttime, such lenses will lose their fashionableness. This is especially true with glasses having aluminum films deposited on the surface of the lenses, because such glasses look fashionable only if the aluminum films reflect light. Prior art sunglasses offer another problem that the colors seen through them differ from the actual colors. This might make it difficult for the wearer to see traffic signals and signs or cause him to misjudge their color.

SUMMARY OF THE INVENTION

It is an object of the present invention to provide a lens for spectacles which obviates the abovesaid shortcomings, which has a sufficient light transmission rate as well as excellent anti-glare properties an which looks fashionable.

Transparent portions are left on the lens for spectacles according to the present invention so that the light transmission rate will be larger than a predetermined value. This will allow the wearer sufficient visibility and brightness. Further, by forming a surface layer such as a fluorescent material layer, a light absorbing layer or a combination thereof in a predetermined pattern, the lens will have a light polarizing ability and thus the glare protective effects. The wearer's eyes will be well protected from glare by use of the lens according to the present invention.

By forming the surface layer from a fluorescent material having such a density that its luminous intensity will be larger than a predetermined level, the fluorescent material will emit light under the influence of external stimuli. This self-luminous action as well as the polarization effect obtained by forming the fluorescent material layer in a predetermined pattern will serve in corporation with each other to improve the fashionableness of the glasses and to protect the eyes while keeping required visibility. Further, the colors seen through the lens are true to the actual colors. Thus, there will be no fear of misjudging the colors of traffic signals and signs.

By patterning the fluorescent material layer in stripes so that each stripe of the fluorescent material layer as well as each striped transparent portion will be 1 to 100 microns wide, the fluorescent material layer will emit light, improving the fashionableness of the lens, whereas the striped transparent portions will serve to polarize the incoming lights, thus allowing only lights having specific vibratory surface to pass through the lens. The light reflected by the sea surface or road surface will be cut off. This will prevent the wearer from being dazzled and thus protect the wearer's eyes while keeping a good visibility.

According to the present invention, the surface layer such as the fluorescent material layer, light absorbing material layer and/or light reflecting material layer is formed into a predetermined pattern to produce special effects such as polarization effect. This will make it possible to protect the wearer's eyes, allow enough visibility and improve the fashionableness of the lens without the necessity of dispersing pigments and coloring agents in the lens.

Other features and objects of the present invention will become apparent from the following description taken with reference to the accompanying drawings, in which:

BRIEF DESCRIPTION OF THE DRAWINGS

FIG. 4 is a partial enlarged sectional view of FIG. 2a;

FIGS. 8 and 11 are plan views of several modifications of the embodiment of FIG. 5;

FIG. 9 is a partial plan view of another modification in which the position of the fluorescent material layer and that of the transparent portions in the embodiment of FIG. 6 are reversed, showing the relationship between the size of each fluorescent material layer and the distance between the adjacent layers and the light transmission rate;

FIGS. 10a to 10d are enlarged plan views of other examples of the shape of the transparent portions or the fluorescent material layers;

FIG. 12 is a schematic sectional view of the fifth embodiment; and

FIGS. 13a and 13b are schematic sectional views of the sixth embodiment

DETAILED DESCRIPTION OF THE PREFERRED EMBODIMENT

Figure 1A:
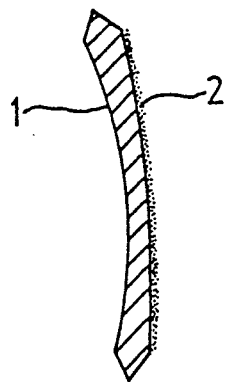
FIGS. 1a and 1b are sectional views of the lens for spectacles according to the present invention.

FIG. 1a shows a lens for spectacles according to the present invention which comprises a lens body 1 made of glass or plastic and coated with a fluorescent material 2. The material 2 should be selected from such materials as to emit fluorescent light when subjected to external stimuli such as light, heat and radiations (including ones which tend to remain luminary even after the external stimuli have disappeared). The fluorescent material 2 should be coated in such a pattern that there remain transparent portions on the surface of the lens so that the area of the transparent portions will be large enough to insure a light transmission rate larger than a predetermined value.

Figure 1B:
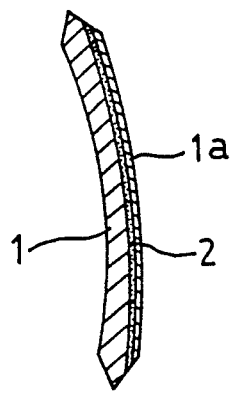

Also, it should have such a density that its luminous intensity is more than a predetermined level. As shown in FIG. 1b, it is preferable to provide a protective coating 1a of the same material as the lens 1. If necessary, the protective coating 1a may contain an ultraviolet absorbing material or may be further coated with an ultraviolet absorbing layer.

Figure 2A:
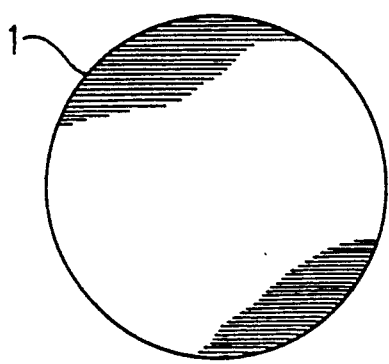
FIG. 2a is a plan view of the second embodiment of the present invention.
Figure 2B:
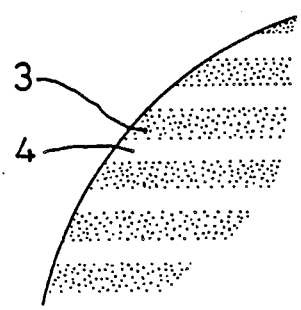
FIG. 2b is an enlarged view of a portion of the same.
Figure 4:
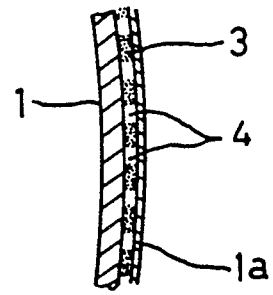

In the second embodiment shown in FIGS. 2a and 2b, the lens 1 is coated with a fluorescent material layer 3 patterned in horizontal stripes. This layer 3 is further coated with a protective layer 1a (FIG. 4). In this embodiment, the adjacent stripes of the fluorescent material layer 3, each stripe being 1 to 100 microns wide, are separated by transparent portions 4 as is clearly shown in FIGS. 2b and 4. The fluorescent material layer 3 will bring about sufficient self-luminous effect, whereas the transparent portions 4 will allow enough light to pass through the lens. Further it was found out that with this arrangement the lens serves to polarize the incoming lights in such a manner that only lights having specific vibratory surface can pass through the lens. This will, for example, cut off lights reflected by the sea surface which tend to dazzle the wearer of the spectacles. Thus the lens according to the present invention has an antiglare effect, too.

Figure 3:
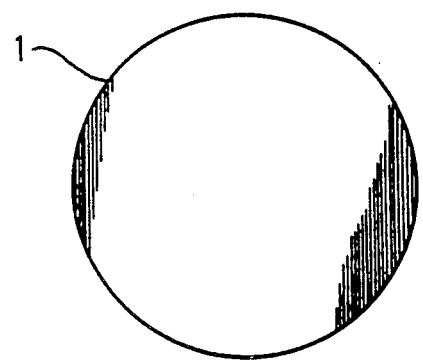
FIG. 3 is a plan view of the third embodiment.

FIG. 3 shows the third embodiment in which the fluorescent material is patterned in vertical stripes. Its functions and effects are the same as the first embodiment.

The fluorescent material layer 3 having the transparent portions 4 may be formed on the lens body 1 by use of various known methods. For example, a fluorescent material may be deposited under vacuum on the lens body 1 after masking the portions 4 to be left uncoated with the masking or screening process or the fluorescent material layer may be formed in any other way such as with the photographic printing process.

If necessary, an interface layer may be provided between the lens body 1 and the fluorescent material layer 3. In that case, the interface layer made of a light absorbing material is firstly printed on the lens in a predetermined pattern. Then the fluorescent material layer 3 is printed thereon so as to be in conformity with the pattern of the interface layer.

Figure 6:
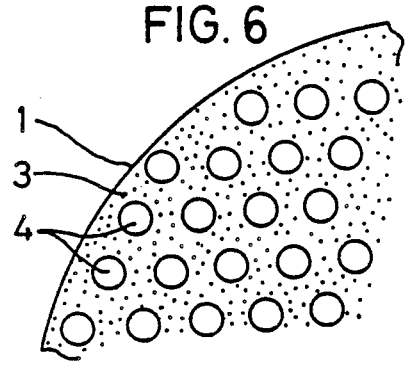
FIGS. 6 and 7 are enlarged plan views showing two different arrangements of the transparent portions.
Figure 5:
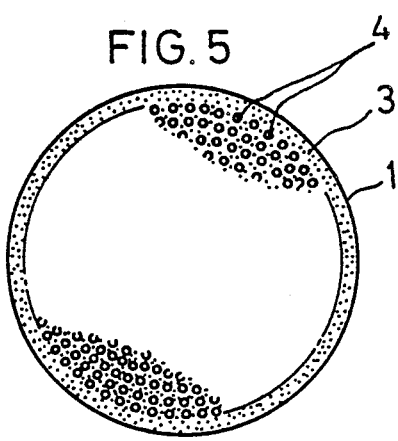
FIG. 5 is a plan view of the fourth embodiment.
Figure 7:
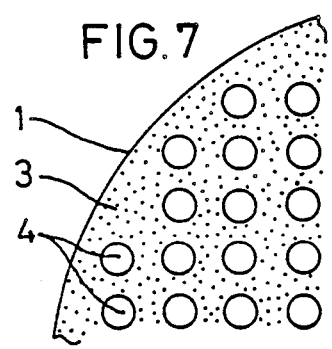

FIG. 5 shows the fourth embodiment in which the fluorescent material layer 3 is formed on the lens 1 with a multiplicity of tiny round transparent portions 4 left over its entire area. The transparent portions 4 may be arranged in a staggered way as shown in FIG. 6 or in cross lines as shown in FIG. 7.

Also, the fluorescent material layer 3 may be formed so that the transparent portions 4 will form a specific pattern as a whole such as a butterfly as shown in FIG. 8 by a borderline 5.

Also, the relationship between the fluorescent material layer 3 and the transparent portions 4 in the embodiments of FIGS. 5 to 8 may be reversed. For example, tiny round fluorescent material coatings 3' may be formed on the lens body 1 over its entire surface with the remaining area 4' left transparent as shown in FIG. 9. In this embodiment, if the fluorescent material layers 3 are so thick that their light shield rate will be 100 per cent, they should be arranged so as to be spaced from adjacent layers 3' by a distance equal to their diameter 2r as shown in FIG. 9. Thus, the lens as a whole has a light transmission rate of 70 per cent or a light shield rate of 30 per cent. The fluorescent material layers 3 (3') and the transparent portions 4 (4') may be circular, square or of any other shape as shown in FIGS. 10a to 10d.

Further, as shown in FIG. 11, the fluorescent material layer 3 may be formed over its entire surface with the transparent portions 4 in the shape of slits about 0.1 mm wide and located close to each other. With this arrangement, the incoming light will be subjected to various optical influences such as diffraction and interference, thereby producing various visual effects. The position of the fluorescent material layer 3 and that of the transparent portions 4 may be reversed as in the other embodiments.

The fluorescent material layers employed in the above-described embodiments may be replaced with a light absorbing material layer, a light reflecting material layer or a combination thereof. Their thickness and density should be determined as required.

FIG. 12 shows still another embodiment in which the lens is coated both on its front side F and back side B with fluorescent material layers 3. The layers 3 may or may not be patterned identical to each other.

In the embodiment shown in FIGS. 13a and 13b, the lens is made by bonding two half lenses H1 and H2 having their opposed surfaces i.e. their respective convex side C and concave side D coated with surface layers 3 (fluorescent material layers). The layers 3 may or may not be patterned identical to each other.

What is claimed:

1. A lens for spectacles comprising:
a lens body made of glass or plastic and a surface layer provided on at least one side of said lens body in a predetermined pattern so that a plurality of transparent portions will be left on said one side of said lens body, said transparent portions having an area such that the light transmission rate of the lens will be less than 100 per cent, said surface layer being a material selected from the group consisting of a fluorescent material, a light absorbing material and a light reflecting material, and said lens further comprising an interface layer interposed between said surface layer and said lens body.

2. A lens for spectacles comprising:
a lens body made of glass or plastic and a surface layer provided on at least one side of said lens body in a predetermined pattern so that a plurality of transparent portions will be left on said one side of said lens body, said transparent portions having an area such that the light transmission rate of the lens will be less than 100 per cent, and an interface layer interposed between said surface layer and said lens body.

3. A lens for spectacles as claimed in claim 1 or 2, wherein said interface layer is made of a light absorbing material.

4. A lens for spectacles as claimed in claim 1 or 2, further comprising a protective coating layer provided on said surface layer to prevent said surface layer from peeling.

5. A lens for spectacles comprising two half lenses provided on their respective convex and concave sides with a surface layer so that a plurality of transparent portions will be left on said convex side and said concave side, said respective transparent portions having such areas that the light transmission rates of said half lenses will be less than 100 per cent, said half lenses being bonded together with said surface layers sandwiched therebetween.

* * * * *